(12) United States Patent
Mandala

(10) Patent No.: US 10,685,487 B2
(45) Date of Patent: Jun. 16, 2020

(54) DISABLING AUGMENTED REALITY (AR) DEVICES AT SPEED

(71) Applicant: QUALCOMM Incorporated, San Diego, CA (US)

(72) Inventor: Jack Mandala, Long Valley, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 13/787,340

(22) Filed: Mar. 6, 2013

(65) Prior Publication Data

US 2014/0253588 A1 Sep. 11, 2014

(51) Int. Cl.
- *G06T 19/00* (2011.01)
- *G02B 27/01* (2006.01)
- *G06F 3/01* (2006.01)

(52) U.S. Cl.
CPC .......... *G06T 19/006* (2013.01); *G02B 27/01* (2013.01); *G02B 27/017* (2013.01); *G06F 3/011* (2013.01); *B60K 2370/1529* (2019.05); *B60K 2370/186* (2019.05); *B60K 2370/195* (2019.05); *B60K 2370/334* (2019.05); *G02B 2027/014* (2013.01)

(58) Field of Classification Search
None
See application file for complete search history.

(56) References Cited

U.S. PATENT DOCUMENTS

| 6,734,834 B1 | 5/2004 | Baram |
| 8,947,323 B1 * | 2/2015 | Raffle .................... G09G 3/001 345/156 |
| 2002/0158815 A1 | 10/2002 | Zwern |
| 2004/0073626 A1 * | 4/2004 | Major et al. .................. 709/217 |
| 2008/0118051 A1 * | 5/2008 | Odinak .................. H04W 4/12 379/265.09 |
| 2010/0253918 A1 | 10/2010 | Seder et al. |
| 2012/0154441 A1 | 6/2012 | Kim |
| 2012/0194554 A1 | 8/2012 | Kaino et al. |
| 2012/0242473 A1 | 9/2012 | Choi |
| 2012/0302289 A1 | 11/2012 | Kang |

(Continued)

FOREIGN PATENT DOCUMENTS

| CN | 101866051 A | 10/2010 |
| CN | 102932624 A | 2/2013 |

(Continued)

OTHER PUBLICATIONS

International Search Report and Written Opinion—PCT/US2014/015832—ISA/EPO—dated Apr. 25, 2014.

(Continued)

*Primary Examiner* — Tize Ma
(74) *Attorney, Agent, or Firm* — QUALCOMM Incorporated

(57) ABSTRACT

Systems, apparatus and methods for limiting information on an augmented reality (AR) display based on various speeds of an AR device are presented. Often information forms a distraction when the wearer is driving, running or even walking. Therefore, the described systems, devices and methods aim to limit information displayed on an AR display based on three or more levels movement (e.g., stationary, walking, driving) such that the wearer is less distracted when higher levels of concentration are needed for real world activities.

34 Claims, 5 Drawing Sheets

(56) References Cited

U.S. PATENT DOCUMENTS

2013/0057638 A1* 3/2013 Tamkivi .................... 348/14.02
2013/0097481 A1* 4/2013 Kotler .................. G06F 17/241
                                                              715/230
2013/0241955 A1* 9/2013 Tamaru ........................ 345/633

FOREIGN PATENT DOCUMENTS

| EP | 2497671 A1 | 9/2012 |
|---|---|---|
| JP | H08233594 A | 9/1996 |
| JP | 2005221465 A | 8/2005 |
| JP | 2007335006 A | 12/2007 |
| JP | 2008205573 A | 9/2008 |
| JP | 2010097472 A | 4/2010 |
| JP | 2011002660 A | 1/2011 |
| JP | 2013032932 A | 2/2013 |
| WO | 2012063542 A1 | 5/2012 |

OTHER PUBLICATIONS

Akidzu A.; "Latest OS/2 Entry Level", C Magazine, Japan, SoftBank Japan KK, Mar. 1, 1990, 2nd Edition, No. 3, Regular Edition, No. 6, vol. 2, No. 3, Edition 6, pp. 30-45.

* cited by examiner

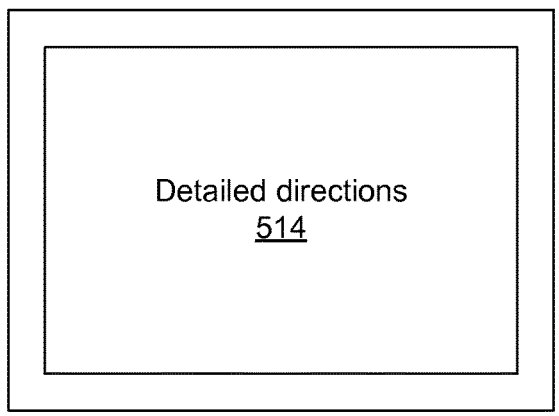
FIG. 12
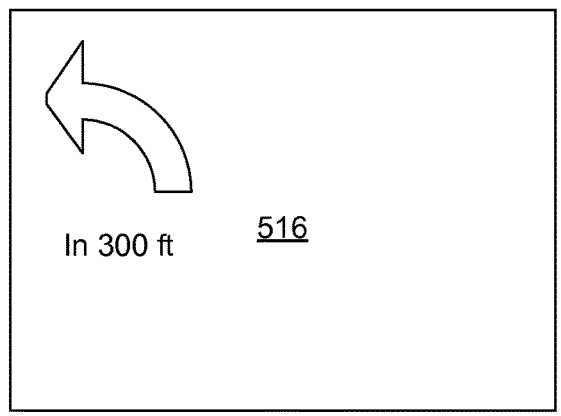
FIG. 13
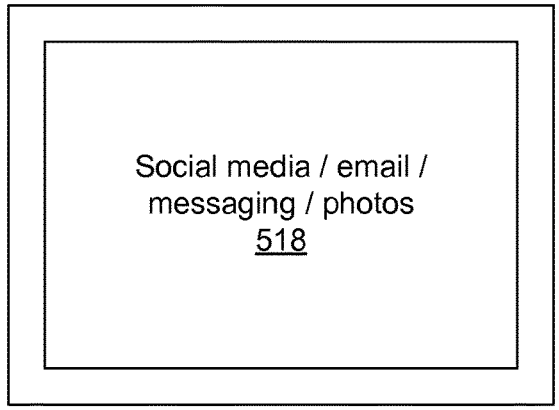
FIG. 14
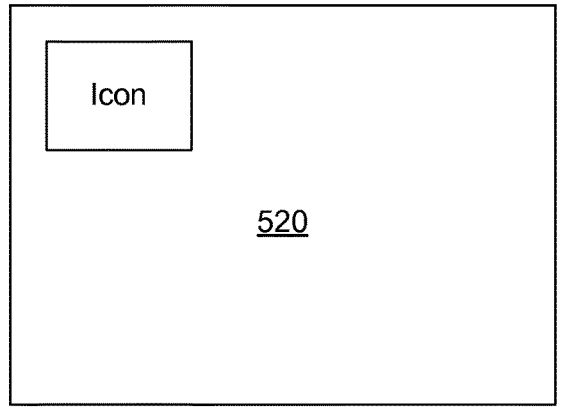
FIG. 15
| Speed (mph) | Web search results | Directions | Weather |
|---|---|---|---|
| 0 – first threshold | Full | Full | Full |
| First to second threshold | icon | Abbreviated | Abbreviated |
| Greater than second threshold | Blank | Further abbreviated | Abbreviated |
FIG. 16

DISABLING AUGMENTED REALITY (AR) DEVICES AT SPEED

CROSS-REFERENCE TO RELATED APPLICATIONS

This is the first application filed for the present technology.

BACKGROUND

I. Field of the Invention

This disclosure relates generally to systems, apparatus and methods for wireless augmented reality (AR) displays, and more particularly to progressively disabling at least a portion of information shown on an AR display when the AR display is traveling at various speeds.

II. Background

An AR device (e.g., AR glasses or other head mounted display) may provide a wearer with information such as web search results, current and predicted weather, directions, social media content, navigation information, email and messaging, pictures, movies and TV programing, and the like. Often this information can form a distraction when the wearer is driving, running or even walking. A method is needed to filter this information based on movement such that the wearer is unnecessarily distracted.

BRIEF SUMMARY

Systems, apparatus and methods for limiting information on an augmented reality (AR) display based on various speeds of an AR device are presented. Often information forms a distraction when the wearer is driving, running or even walking. Therefore, the described systems, devices and methods aim to limit information displayed on an AR display based on three or more levels movement (e.g., stationary, walking, driving) such that the wearer is less distracted when higher levels of concentration are needed for real world activities.

According to some aspects, disclosed is a method for limiting information on an augmented reality (AR) display of an AR device, the method comprising: determining a speed of the AR device; comparing the speed relative to a first threshold and a second threshold; and filtering the AR display based on comparing the speed relative to the first threshold and the second threshold, wherein filtering the AR display comprises: allowing full information for display on the AR display when the speed is below the first threshold; limiting from the full information to abbreviated information for display on the AR display when the speed is above the first threshold and below the second threshold; and curtailing to curtailed information when the speed is above the second threshold.

According to some aspects, disclosed is an augmented reality (AR) system for limiting information on an AR display of an AR device, the AR system comprising: the AR device comprising the AR display, wherein the AR device is configured to project information on the AR display; a speed sensor, wherein the speed sensor provides a speed; and a processor, wherein the processor is configured to: allow full information to be displayed on the AR display based on the speed being below a first threshold; limit from the full information to abbreviated information to be displayed on the AR display based on the speed being above the first threshold and below a second threshold; and curtail to curtailed information based on the speed being above the second threshold.

According to some aspects, disclosed is an augmented reality (AR) system for limiting information on an AR display of an AR device, the system comprising: means for determining a speed of the AR device; means for comparing the speed relative to a first threshold and a second threshold; and means for filtering the AR display based on comparing the speed relative to the first threshold and the second threshold, wherein the means for filtering the AR display comprises: means for allowing full information for display on the AR display when the speed is below the first threshold; means for limiting from the full information to abbreviated information for display on the AR display when the speed is above the first threshold and below the second threshold; and means for curtailing the abbreviated information when the speed is above the second threshold.

According to some aspects, disclosed is an augmented reality (AR) device for limiting information on an AR display, the AR device comprising a processor and a memory wherein the memory includes software instructions to: determine a speed of the AR device; compare the speed relative to a first threshold and a second threshold; and filter the AR display based on comparing the speed relative to the first threshold and the second threshold, wherein the software instructions to filter the AR display comprises software instructions to: allow full information for display on the AR display when the speed is below the first threshold; limit from the full information to abbreviated information for display on the AR display when the speed is above the first threshold and below the second threshold; and curtail to curtailed information when the speed is above the second threshold.

According to some aspects, disclosed is a non-transient computer-readable storage medium including program code stored thereon for limiting information on an augmented reality (AR) display of an AR device, the non-transient computer-readable storage medium comprising program code to: determine a speed of the AR device; compare the speed relative to a first threshold and a second threshold; and filter the AR display based on comparing the speed relative to the first threshold and the second threshold, wherein the program code to filter the AR display comprises program code to: allow full information for display on the AR display when the speed is below the first threshold; limit from the full information to abbreviated information for display on the AR display when the speed is above the first threshold and below the second threshold; and curtail to curtailed information when the speed is above the second threshold.

In some embodiments, limiting from the full information to the abbreviated information for display on the AR display comprises replacing text with an icon.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIGS. 6-15 illustrate various AR displays, in accordance with some embodiments of the present invention.

FIG. 16 tabulates items displayed based on varying speeds, in accordance with some embodiments of the present invention.

DETAILED DESCRIPTION

Figure 1:
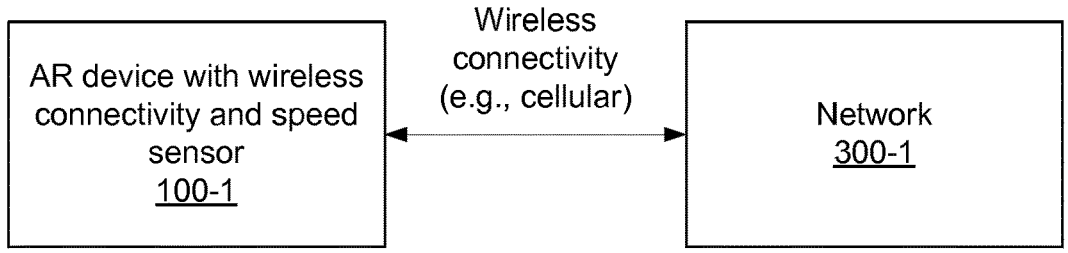
FIGS. 1-4 illustrate an AR system, in accordance with some embodiments of the present invention.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Systems, apparatus and methods for filtering information to be displayed on an augmented reality (AR) display based on various speeds of an AR device from full information to limited information to curtailed information are presented. Often information forms a distraction when the wearer is driving, running or even walking. Therefore, the described systems, devices and methods aim to filtering information to be displayed on an AR display based on three or more levels movement (e.g., stationary, walking, driving) such that the wearer is less distracted when higher levels of concentration is needed for real world activities.

FIGS. 1-4 illustrate an AR system, in accordance with some embodiments of the present invention. Some AR systems include an AR device 100, a mobile device 200 and a network 300. The AR device 100 may be stand-alone or integrated with a mobile device 200. The AR device 100 may be indirectly coupled, via a mobile device 200, to a network 300. The AR device 100 may be connected directly to a network 300 without a separate mobile device 200. The AR device 100 may be uncoupled to a network 300. When included, a mobile device 200 may provide communication between the AR device 100 and the network 300. The network 300 may be a cellular network and/or a WiFi network and possibly connected to a server on the Internet.

In FIG. 1, a system includes an AR device 100-1 communicating with a network 300-1. A separate mobile device 200 is not included. The AR device 100-1 includes wireless circuitry and a speed sensor. The AR device 100-1 may be in the form of glasses or other head mounted display or a mobile device having a display or image projector. The wireless circuitry allows the AR device 100-1 to wirelessly connect to the network 300-1 using a wide area network (WAN). The WAN wireless circuitry may include an interconnection to a WAN network (e.g., a cellular network and/or WiFi network). The speed sensor, which may include a GPS device, a motion sensor, an accelerometer, a gyrometer, and/or the like. The speed sensor may be a receiver to receive a message including a speed or velocity parameter. In any case, the speed sensor and a processor in the AR device 100 may detect which category of speed the AR device 100-1 is travelling.

Figure 2:
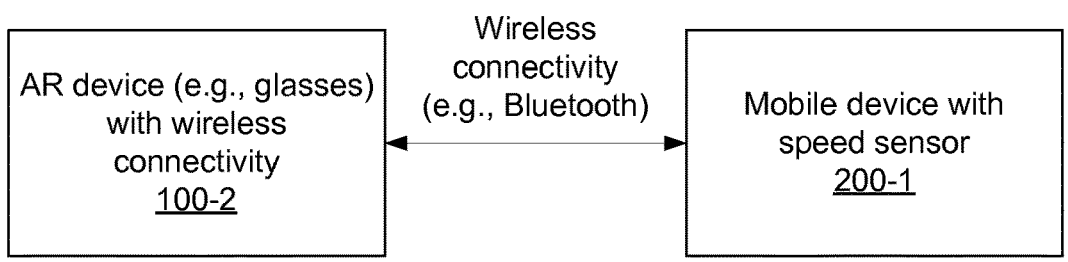

In FIG. 2, an AR device 100-2 is wirelessly coupled to a mobile device 200-1. The AR device 100-2 includes wireless circuitry to connect to the mobile device 200-1 via a personal area network (PAN), such as Bluetooth wireless circuitry. The AR device 100-2 might not have WAN connectivity. Also, the mobile device 200-1 may or may not have WAN connectivity to a network 300. The AR device 100-2 may be in the form of a head mounted or the like. The mobile device 200-1 includes a speed sensor and a processor to detect which category of speed the mobile device 200-1 is travelling and therefore the speed of the AR device 100-1, which is assumed to be travelling with the mobile device 200-1, becomes known.

Figure 3:
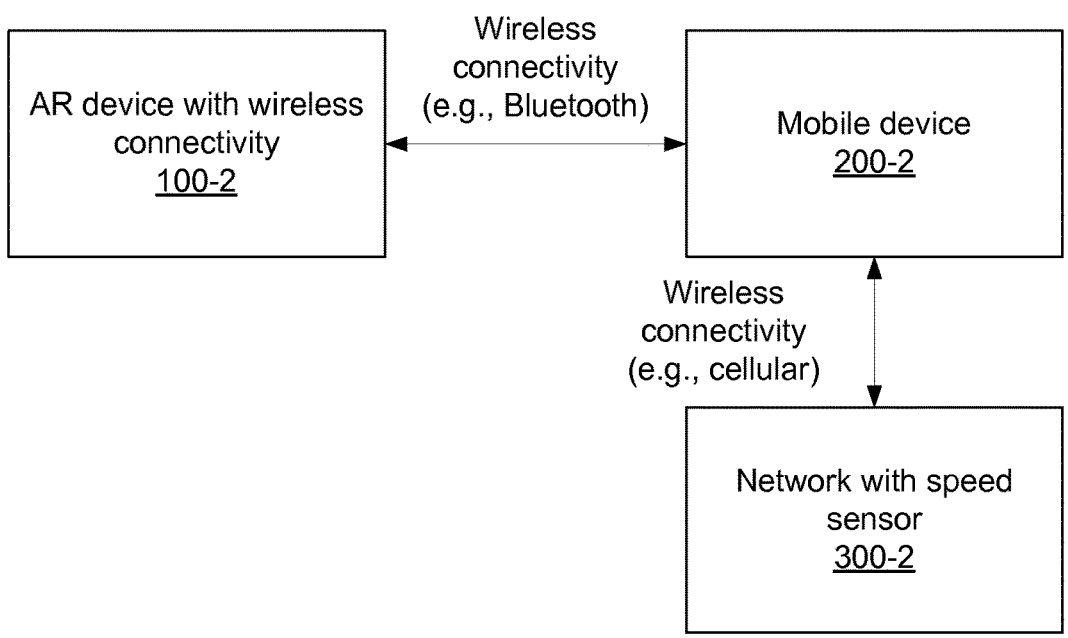

In FIG. 3, a system includes an AR device 100-2 (described above), a mobile device 200-2 and a network 300-2. The AR device 100-2 communicates with the mobile device 200-2 using a PAN interface. In turn, the mobile device 200-2 communicates with the AR device 100 with another PAN interface and with the network 300-2 using a WAN interface. In this figure, the network 300-2 determines a speed of the mobile device 200-2, and therefore, a speed of the AR device 100-2. The mobile device 200-2 receives a message from the network 300-2 containing this speed or a quantized level of the speed.

Figure 4:
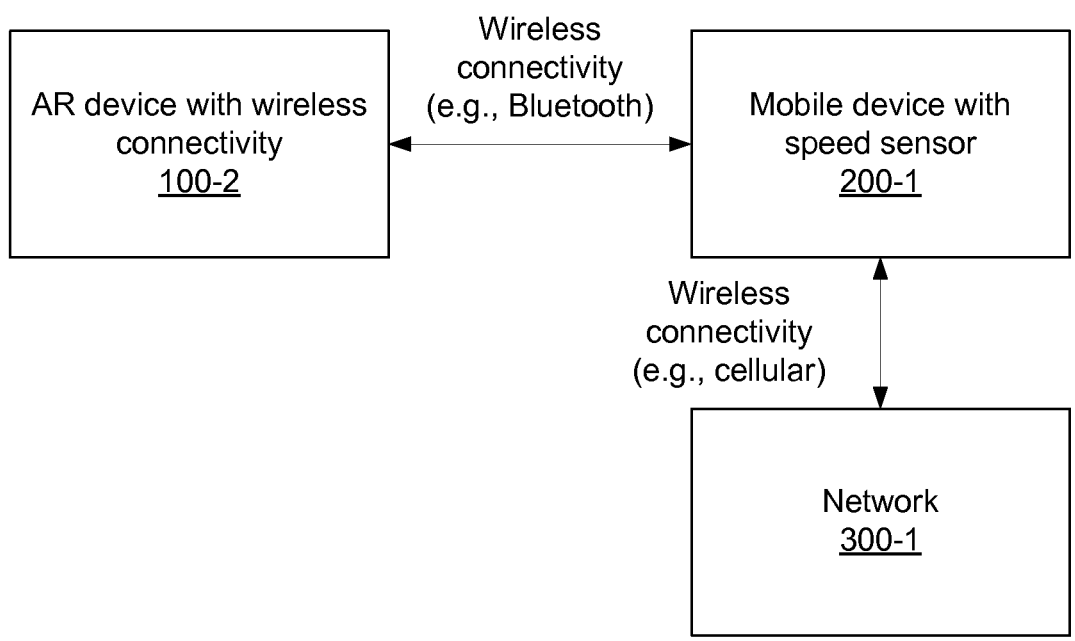

In FIG. 4, a system includes an AR device 100-2 (described above), a mobile device 200-1 and a network 300-2. The mobile device 200-1 includes a speed sensor and a processor to detect which category of speed the mobile device 200-1 is travelling and therefore the speed of the AR device 100-2, which is assumed to be travelling with the mobile device 200-1, becomes known.

In each system describe above, speed is quantize or equivalently compared with thresholds to categorized motion into at least three categories (e.g., stationary, walking, driving). The speed of the AR device 100 may be determined by the network 300, the mobile device 200 or the AR device 100 itself.

FIGS. 6-15 illustrate various AR displays, in accordance with some embodiments of the present invention.

Figure 5:
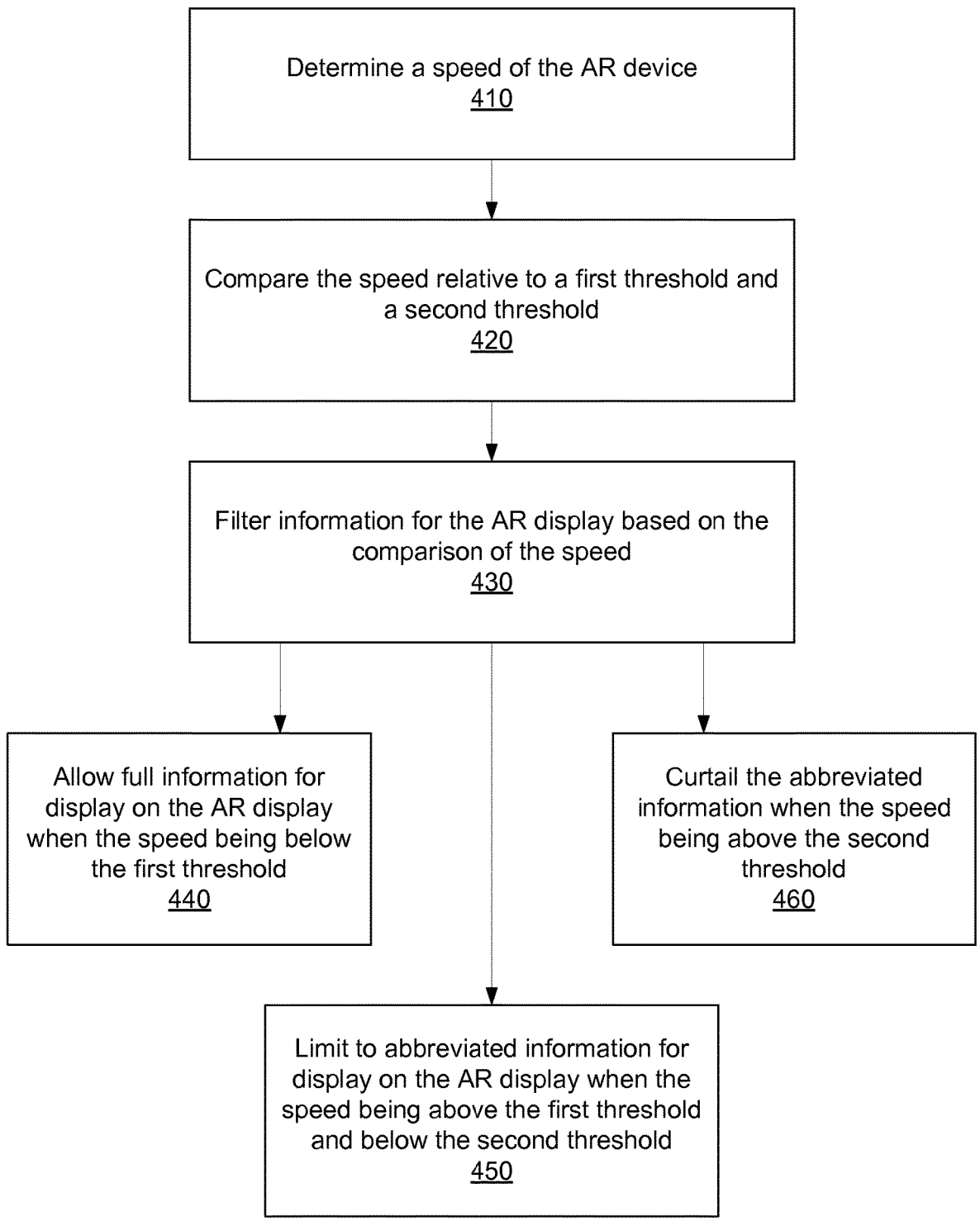
FIG. 5 shows a method to limit an AR display based on a speed, in accordance with some embodiments of the present invention.

In FIG. 5, a method 400 to limit an AR display based on a speed is shown, in accordance with some embodiments of the present invention. Processing may occur in the AR device 100. Alternatively, processing may be off loaded to a mobile device 200 or a network 300. In any case, the AR device 100 shows different levels, volumes, amounts or kinds of information based on a current speed being between certain thresholds. The following example assumes that speed is increasing among three non-overlapping categories: from a stationary position (below a first threshold) to a walking speed (between the first threshold and a second threshold) and finally to a driving speed (above the second threshold). In general, less distracting information is presented via the AR device 100 to a user as speed increases.

At 410, a processor determining a speed of the AR device 100. The processor that determines the speed may be in the AR device 100, in an accompanying mobile device 200, in a network 300 or combination thereof that tracks either the AR device 100 or a mobile device 200. Often, a mobile device 200 has a built-in GPS receiver that may be used to determine a speed of the mobile device 200 (and therefore the accompanying AR device 100). The same processor or a different processor determines if the AR device 100 is travelling at a particular speed.

At 420, a processor compares the speed relative to a first threshold and a second threshold. For example, the first threshold may delineate a stationary user from a walking user and the second threshold may delineate a walking user from a driving user.

At 430, the processor filters information for the AR display based on the comparison of the determined speed relative to the first threshold and the second threshold. Filtering is further described at step 440 (stationary), step 450 (walking) and step 460 (driving).

At 440, the processor allows all of the AR information to be shown on the AR device 100 based on the first speed being less than the first threshold. In this case, the AR device 100 is travelling below the first threshold speed (e.g., assumed to delineate a stationary user from a user walking) therefore no AR information is filtered. The processor may be in a mobile device 200 feeding AR information to the AR device 100. Alternately, the processor may be in the AR device 100 itself determining what AR information to display based on the determined speed. Alternatively, the processor may be in a network 300 and feeding AR information to the AR device 100 indirectly via a mobile device 200 or directly via the network 300.

At 450, the processor limits the full information to abbreviated information to be displayed on the AR display when the speed being above the first threshold and below the second threshold. In this case, the AR device 100 is travelling above the first threshold speed but below a second threshold. For example, the AR device 100 is now moving at a walking speed, which is between the first threshold and second threshold. The processor may filter a portion of the AR information. For example, the abbreviated information may be just an icon or a few bytes of AR information, an audible sound, text read aloud, or an icon or text displayed for only a few seconds, thereby limiting distractions to the user.

At 460, the processor further curtails the full information or the abbreviated information to curtailed information when the speed being above the second threshold. In this case, the AR device 100 is travelling above the second threshold. For example, the AR device 100 is now moving at a driving speed, which is above the second threshold. The AR device 100 may curtail the information by either further limiting the abbreviated AR information or displaying no AR information based on the AR device 100 travelling above the second threshold. That is, the processor may filter a substantial portion or all of the AR information. For example, the AR display may show no AR information at all, filter a few bytes to just an icon, play a sound, convert written text to audible sound, and/or momentarily show abbreviated information for a predetermined amount of time (e.g., 1, 2, 5 or 10 seconds).

The AR device 100 may cycle between travelling slower and faster than the first threshold and second threshold speeds. As such, the AR display may show full AR information, differing amounts of abbreviated AR information, or no AR information as the AR device 100 changes speed. Generally, the AR device display less information as the AR device increases in speed thresholds until very limited or no AR information is displayed. Therefore, the abbreviated information includes less information than the full information and the curtailed information includes less information than the abbreviated information. For example, an icon includes less information than text. Similarly, audio or a beep includes less information than an icon. A lower resolution image includes less information than a higher resolution image. A smaller image includes less information than a larger image. A beep includes less information than read text.

An AR device 100 (e.g., a head mounted display such as AR glasses) may provide a wearer with information such as web search results, current and predicted weather, directions, social media content, navigation information, email and messaging, pictures, movies and TV programing, and the like. To limit distractions, some of this information is limited when the wearer is travelling at a speed above a first threshold and further limited or disabled when the wearer is travelling at a speed above a higher second threshold.

Figure 6:
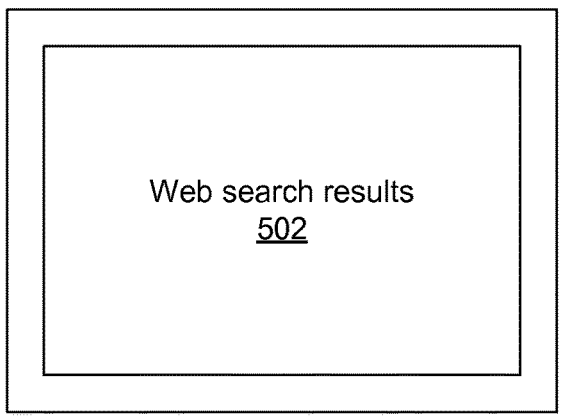
Figure 7:
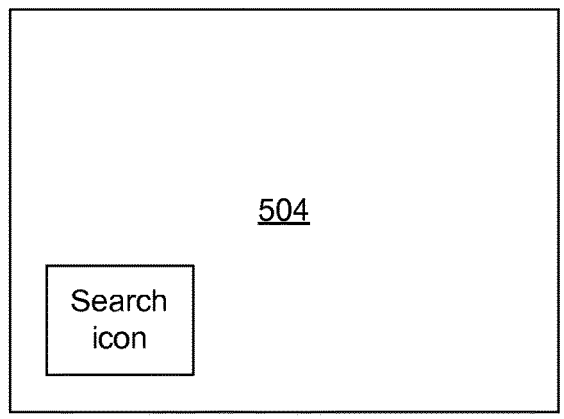
Figure 8:
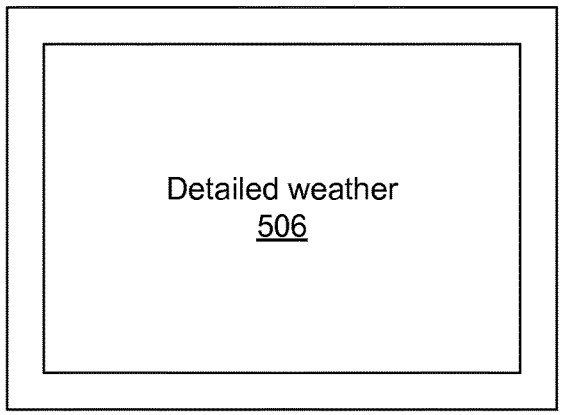
Figure 9:
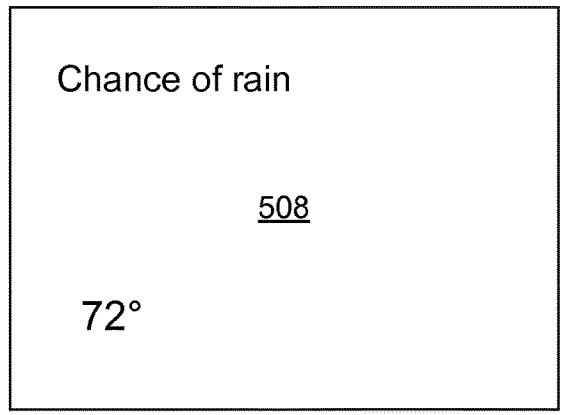
Figure 10:
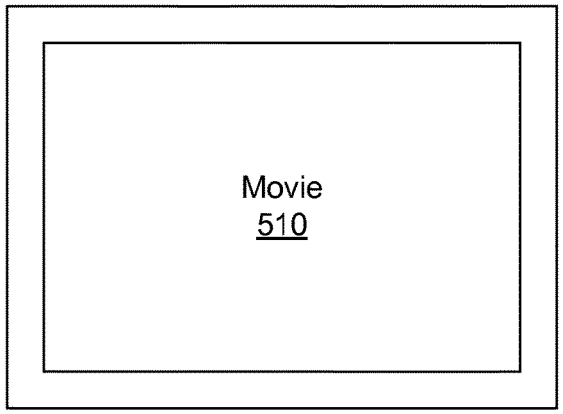
Figure 11:
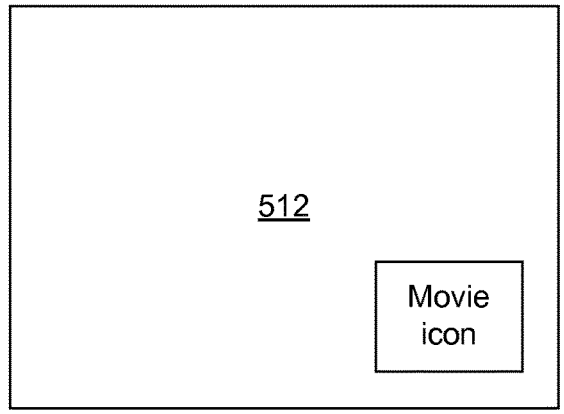

As shown in FIG. 6, for example, web search results are shown in full detail and centered on the AR display when stationary. As shown in FIG. 7, the web search results as an icon to the side of the main field of view when moving between a first threshold and a second threshold (e.g., walking). In FIG. 8, the weather is shown in complete and detailed information when stationary. In FIG. 9, however, the weather is limited to current temperature and a simple daily forecast, such as "partially cloudy" or "chance of rain" when moving between a first threshold and a second threshold. In FIG. 10, a movie is shown across the entire screen when stationary. In FIG. 11, however, the movie or TV programming is paused and shown to the side as an icon. In FIG. 12, detailed directions are shown when stationary. In FIG. 13, the detailed directions are converted to brief step-by-step directions when moving between a first threshold and a second threshold. In FIG. 14, AR information such as from a social media application or site, email, messaging or photos are shown in full detail when stationary. In FIG. 15, however, this AR information is shown as an icon shifted to the corner so as to not distract the user when moving between a first threshold and a second threshold. In each of the embodiments above, an AR display is disabled when moving above the second threshold.

AR information to be displayed may be filtered based on speed. For example, when a wearer is stationary or travelling below a first threshold speed, the AR information is fully presented. When the wearer is travelling above the first threshold speed but below a second threshold speed, the AR information is abbreviated. When the wearer is travelling above the second threshold speed, the AR information is further abbreviated or disabled. Alternatively, more than two thresholds are used. That is, when the wearer is travelling below a first threshold (e.g., near stationary), the AR information is fully available. When the wearer is travelling between the first threshold and a second threshold (e.g., walking), some AR information is abbreviated. When the wearer is travelling between the second threshold and a third threshold (e.g., jogging), more is abbreviated. When the wearer is travelling above the third threshold (e.g., driving), even more of the AR information is abbreviated or disabled.

FIG. 16 tabulates items displayed based on varying speeds, in accordance with some embodiments of the present invention. AR information to be displayed may be filter based on speed and content. The speed (e.g., in mph or kph) may be quantized into three or more categories. For example, below a first threshold, an AR device 100 may be considered stationary or hardly moving. Between the first threshold and a second threshold, the AR device 100 may be considered walking or moving slowly. Above the second threshold, the AR device 100 may be considered driving or moving quickly. Additionally categories or quantization levels may be considered.

As shown, web search results, weather and directions may each be treated differently. Web search results may be shown in full detail when stationary and as an icon when slowly moving but disabled when quickly moving. Directions may be shown in full detail when stationary, as an abbreviated list when walking, and abbreviated to one line showing a next turn when the wearer is driving. The weather may be shown in full detail with stationary and abbreviated to the same detail when either walking or driving.

AR information to be abbreviated by displaying it momentarily (i.e., for a predetermined amount of time based on speed). For example, if a new message arrives when the wearer is stationary (or travelling below a first threshold speed), the full message is displayed. When the wearer is traveling above the first threshold speed and below a second threshold speed, an icon momentarily appears (e.g., for two seconds) to notify the wearer of a new message, and then disappears or minimizes to an icon. When the wearer is traveling above the second threshold speed, an audio alert momentarily sounds (e.g., a beep, a message stating "you've got mail" or "point of interest on the left") to notify the wearer of a new event. At this point, the wearer may use audio prompts and commands (e.g., "read my mail") thus avoiding visual distractions or may move at a slower speed.

In addition, speed or quantized speed may be determined without determining an actual velocity. For example, a motion sensor may determine an AR device 100 or a mobile device 200 is at rest when the motion sensor detects no or little movement (say, below a first threshold), slow movement when the motion sensor detects some movement (say, between the first threshold and a second threshold), and fast movement when the motion sensor detects rapidly changing movement or vibrations (say, above the second threshold). In this case, no or little movement represents rest, some movement represents walking, and significant movement represents driving. In addition, a user may override this threshold test, for example, when the user is a passenger in a car or public transportation, such as a taxi, train, bus or airplane.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers.

Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for limiting information on an augmented reality (AR) display of an AR device, the method comprising:
    determining a speed of the AR device;
    determining a category of motion based, at least in part, on comparing the speed to thresholds, wherein the category of motion comprises a first category, a second category, and a third category, wherein a first threshold delineates between the first category and the second category, and wherein a second threshold delineates between the second category and the third category; and
    filtering the AR display based on determining the category of motion, wherein filtering, the AR display comprises:
        allowing tint information for display on the AR display for the first category, the full information comprising at least text or images;
        limiting from the information to abbreviated information for display on the AR display for the second category, by disabling information display in a center area and at least replacing the full information shown across the entire AR display including the center area with an icon displayed in a side or a corner of the AR display, wherein the icon comprises less information than the full information; and
        transitioning to curtailed information for the third category, wherein the curtailed information comprises less information than the abbreviated information.

2. The method of claim 1, wherein the AR device comprises a head mounted display.

3. The method of claim 1, wherein the first threshold delineates the user being stationary from the user walking.

4. The method of claim 1, wherein the second threshold delineates the user walking from the user driving.

5. The method of claim 1, wherein determining the speed of the AR device comprises determining the speed of a mobile device.

6. The method of claim 1, wherein curtailing to the curtailed information comprises momentarily presenting the curtailed information.

7. The method of claim 1, wherein curtailing to the curtailed information comprises:
    determining an information type of the full information; and
    displaying the curtailed information based on the information type.

8. The method of claim 1, wherein curtailing to the curtailed information comprises informing the user momentarily.

9. The method of claim 1, wherein curtailing to the curtailed information comprises disabling displaying of any AR information.

10. The method of claim 1, wherein the curtailed information consists of an audio signal.

11. The method of claim 1, wherein the icon is displayed in a corner of the AR display.

12. The method of claim 1, wherein the full information comprises text and an image, and wherein at least the text and the image are replaced with the icon displayed in the side or the corner of the AR display.

13. An augmented reality (AR) system for limiting information on an AR display of an AR device, the AR system comprising:
    the AR device comprising the AR display, wherein the AR device is configured to project information on the AR display;
    a speed sensor, wherein the speed sensor provides a speed; and
    a processor, wherein the processor is configured to:
        determine a category of motion based, at least in part, on comparing the speed to thresholds, wherein the category of motion comprises a first category, a second category, and a third category, wherein a first threshold delineates between the first category and the second category, and wherein a second threshold delineates between the second category and the third category;
        allow full information to be displayed on the AR display for the first category, the information comprising at least text or images;
        limit from the full information to abbreviated information to be displayed on the AR display for the second category, by disabling information display in a center area and at least replacing the full information shown across the entire AR display including the center area with an icon displayed in a side or a corner of the AR display, wherein the icon comprises less information than the full information; and
        transition to curtailed information for the third category, wherein the curtailed information comprises less information than the abbreviated information.

14. The AR system of claim 13, wherein the AR device comprises a lead mounted display.

15. The AR system of claim 13, wherein the AR device comprises the speed sensor.

16. The AR system of claim 13, further comprising a mobile device.

17. The AR system of claim 16, wherein the mobile device comprises the processor.

18. The AR system of claim 13, wherein the processor to curtail to the curtailed information comprises a processor to momentarily present the curtailed information.

19. The AR system of claim 13, wherein the processor to curtail to the curtailed information comprises a processor to inform the user momentarily.

20. The AR system of claim 13, wherein the curtailed information consists of an audio signal.

21. An augmented reality (AR) system for limiting information on an AR display of an AR device, the system comprising:
   means for determining a speed of the AR device;
   means for determining a category of motion based, at least in part, on comparing the speed to thresholds, wherein the category of motion comprises a first category, a second category, and a third category, wherein a first threshold delineates between the first category and the second category, and wherein a second threshold delineates between the second category and the third category; and
   means for filtering the AR display based on the means for determining the category of motion, wherein the means for filtering the AR display comprises:
      means for allowing full information for display on the AR display for the first category, the full information comprising at least text or images;
      means for limiting from the full information to abbreviated information for display on the AR display for the second category, by disabling information display in a center area and at least replacing the full information shown across the entire AR display including the center area with an icon displayed in a side or a corner of the AR display, wherein the icon comprises less information than the full information; and
      means for transitioning to curtailed information for the third category, wherein the curtailed information comprises less information than the abbreviated information.

22. The system of claim 21, wherein the AR device comprises a head mounted display.

23. The system of claim 21, further comprising means for determining an information type of the full information.

24. The system of claim 21, wherein the curtailed information comprises the icon.

25. The system of claim 21, wherein the means for curtailing to the curtailed information comprises means the informing the user momentarily.

26. The system of claim 21, wherein the means for curtailing to the curtailed information comprises means for disabling displaying of any AR information.

27. The system of claim 21, wherein the curtailed information consists of an audio signal.

28. The system of claim 21, wherein the means for curtailing to the curtailed information comprises means for momentarily presenting the curtailed information.

29. An augmented reality (AR) device for limiting information on an AR display, the AR device comprising a processor and a memory wherein the memory includes software instructions to:
   determine a speed of the AR device;
   determine a category of motion based, at least in part, on comparing the speed to thresholds, wherein the category of motion comprises a first category, a second category, and a third category, wherein a first threshold delineates between the first category and the second category, and wherein a second threshold delineates between the second category and the third category; and
   filter the AR display based on determining the category of motion, wherein the software instructions to filter the AR display comprises software instructions to:
      allow full information to be displayed on the AR display fir the first category, the full information comprising at least text or images;
      limit from the full information to abbreviated information to be displayed on the AR display for the second category, by disabling information display in a center area and at least replacing the full information shown across the entire AR display including the center area with an icon displayed in a side or a corner of the AR display, wherein the icon comprises less information than the full information; and
      transition to curtailed information for the third category, wherein the curtailed information comprises less information than the abbreviated information.

30. The AR device of claim 29, wherein the AR device comprises a head mounted display.

31. The AR device of claim 28, further comprising software instructions to determine an information type of the full information.

32. The AR device of claim 29, wherein the curtailed information consists of an audio signal.

33. A non-transient computer-readable storage medium including program code stored thereon for limiting information on an augmented reality (AR) display of an AR device, the non-transient computer-readable storage medium comprising program code to:
   determine a speed of the AR device;
   determine a category of motion based, at least in part, on comparing the speed to thresholds, wherein the category of motion comprises a first category, a second category, and a third category, wherein a first threshold delineates between the first category and the second category, and wherein a second threshold delineates between the second category and the third category; and
   filter the AR display based on determining the category of motion, wherein the program code to filter the AR display comprises program code to:
      allow full information to be displayed on the AR display for the first category, the full information comprising at least text or images;
      limit from the full information to abbreviated information to be displayed on the AR display for the second category, by disabling information display in a center area and at least replacing the full information shown across the entire AR display including the center area with an icon displayed in a side or a corner of the AR display, wherein the icon comprises less information than the full information; and
      transition to curtailed information for the third category, wherein the curtailed information comprises less information than the abbreviated information.

34. The non-transient computer-readable storage medium of claim 33, wherein the curtailed information consists of an audio signal.

* * * * *